United States Patent
Xie et al.

(10) Patent No.: US 8,494,368 B2
(45) Date of Patent: Jul. 23, 2013

(54) ELECTRONIC NONLINEARITY COMPENSATION FOR OPTICAL TRANSMISSION SYSTEMS

(75) Inventors: Chongjin Xie, Morganville, NJ (US); René-Jean Essiambre, Red Bank, NJ (US)

(73) Assignee: Alcatel Lucent, Paris (FR)

( * ) Notice: Subject to any disclaimer, the term of this patent is extended or adjusted under 35 U.S.C. 154(b) by 177 days.

(21) Appl. No.: 12/762,127

(22) Filed: Apr. 16, 2010

(65) Prior Publication Data

US 2011/0255879 A1   Oct. 20, 2011

(51) Int. Cl.
*H04B 10/00* (2006.01)
*H04B 10/12* (2006.01)
*H04J 14/02* (2006.01)

(52) U.S. Cl.
USPC ............ 398/81; 398/147; 398/149; 398/159; 398/208

(58) Field of Classification Search
USPC ............ 398/29, 81, 147–150, 158, 159, 202, 398/208
See application file for complete search history.

(56) References Cited

U.S. PATENT DOCUMENTS

| | | | |
|---|---|---|---|
| 7,039,272 B2* | 5/2006 | Uda | 385/24 |
| 2009/0214201 A1* | 8/2009 | Oda et al. | 398/25 |
| 2010/0046961 A1* | 2/2010 | Tanimura et al. | 398/159 |

FOREIGN PATENT DOCUMENTS

| | | |
|---|---|---|
| EP | 2 157 716 A1 | 2/2010 |
| WO | PCT/US2011/032012 | 7/2011 |

OTHER PUBLICATIONS

Charlet, G. et al, "Transmission of 40Gb/s QPSK with Coherent Detection over Ultra-Long Distance Improved by Nonlinearity Mitigation", ECOC'06, Sep. 24-28, 2006, TH4.3.4, 2 pgs.

Roberts, Kim et al, "Electronic Precompensation of Optical Nonlinearity", IEEE Photonics Technology Letters, Jan. 15, 2006, pp. 403-405, vol. 18, No. 2.

Tsang, Mankei et al, "Reverse Propagation of femtosecond pulses in optical fibers", Optics Letters, Oct. 15, 2003, pp. 1873-1875, vol. 28, No. 20.

Oda, Shoichiro et al, "112 Gb/s DP-QPSK Transmission Using a Novel Nonlinear Compensator in Digital Coherent Receiver", GFC'09, Mar. 22, 2009, OthR6, 3 pgs.

Charlet, G. et al, "72×100Gb/s transmission over transoceanic distance, using large effective area fiber, hybrid Raman-Erbium amplification and coherent detection", OFC'09, Mar. 22, 2009, PDPB6, 3 pgs.

Alfiad, M. S. et al, "111-Gb/s POLMUX-RZ-DQPSK Transmission over LEAF: Optical versus Electrical Dispersion Compensation", OFC'00, Mar. 22, 2009, OthR4. 3 pgs.

Xie, Chongjin, "WDM coherent PDM-QPSK systems with and without inline optical dispersion compensation", Optics Express, Mar. 16, 2009, pp. 4815-4823, vol. 17, No. 6.

(Continued)

*Primary Examiner* — Dalzid Singh
(74) *Attorney, Agent, or Firm* — D. M. Labruno

(57) ABSTRACT

Embodiments for optical communication are provided in which a receiver includes a digital signal processor configured to process a digital form of an input signal. In one embodiment, the digital signal processor includes a first electronic chromatic dispersion compensation module for compensating the digital form of the input signal, at least one nonlinearity compensation stage for serially compensating an output of the electronic chromatic dispersion compensation module; and a second electronic chromatic dispersion compensation module for compensating an output of the at least one nonlinearity compensation stage.

20 Claims, 3 Drawing Sheets

OTHER PUBLICATIONS

Kikuchi, Kazuro, "Electronic Post-compensation for Nonlinear Phase Fluctuations in a 1000-km 20-Gbit/s Optical Quadrature Phase-shift Keying Transmission System Using the Digital Coherent Receiver", Optics Express, Jan. 21, 2008, pp. 889-896, vol. 16, No. 2.

Kuschnerov, Maxim et al, "DSP for Coherent Single-Carrier Receivers", J. of Lightwave Technology, Aug. 15, 2009, pp. 3614-3622, vol. 27, No. 16.

Ip, Ezra et al, "Compensation of Dispersion and Nonlinear Impairments Using Digital Backpropagation", J. of Lightwave Technology, Oct. 15, 2008, pp. 3416-3425, vol. 26, No. 20.

Essiambre, Rene-Jean et al, "Capacity Limits of Optical Fiber Networks", J. of Lightwave Technology, Feb. 15, 2010, pp. 662-701, vol. 28, No. 4.

Xie, Chongjin, "Suppression of Inter-Channel Nonlinearities in WDM Coherent PDM-QPSK Systems Using Periodic-Group-Delay Dispersion Compensators", ECOC'09, Sep. 20-24, 2009, Paper P4.08, 2 pgs.

Tanimura, Takahito et al, "Systematic Analysis on Multi-Segment Dual-Polarisation Nonlinear Compensation in 112 Gb/s DP-QPSK Coherent Receiver", ECOC'09, Sep. 20-24, 2009, Paper 9.4.5, 2 pgs.

Savory, S. J., et al, "Digital Equalisation of 40Gbit/s per Wavelength Transmission over 2480km of Standard Fibre without Optical Dispersion Compensation", ECOC'06, Sep. 24-28, 2006, TH2.5.5, 2 pgs.

Essiambre, Rene-Jean et al, "Fibre Nonlinearities in Electronically Pre-Distorted Transmission", ECOC/05, Sep. 25-29, 2005, Paper Tu 3.2.2, 2 pgs., vol. 2.

\* cited by examiner

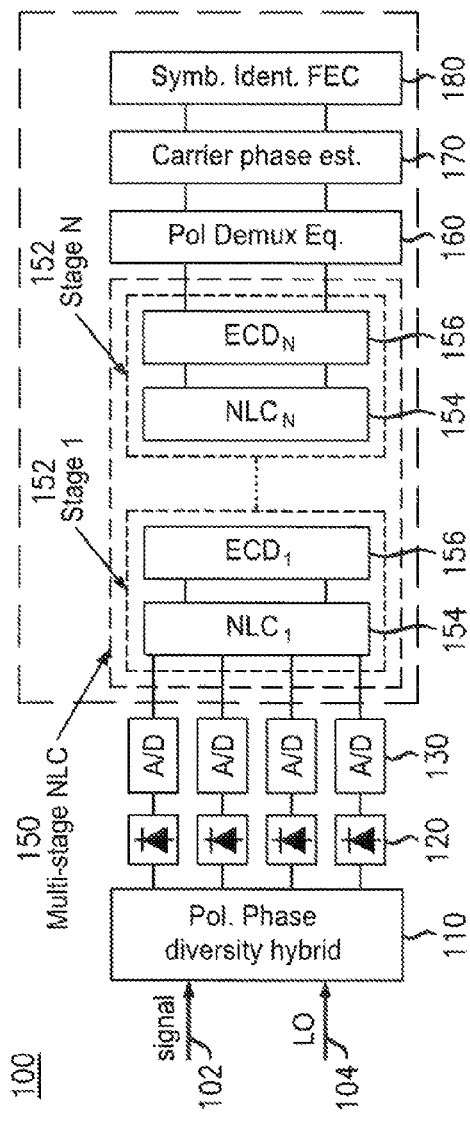
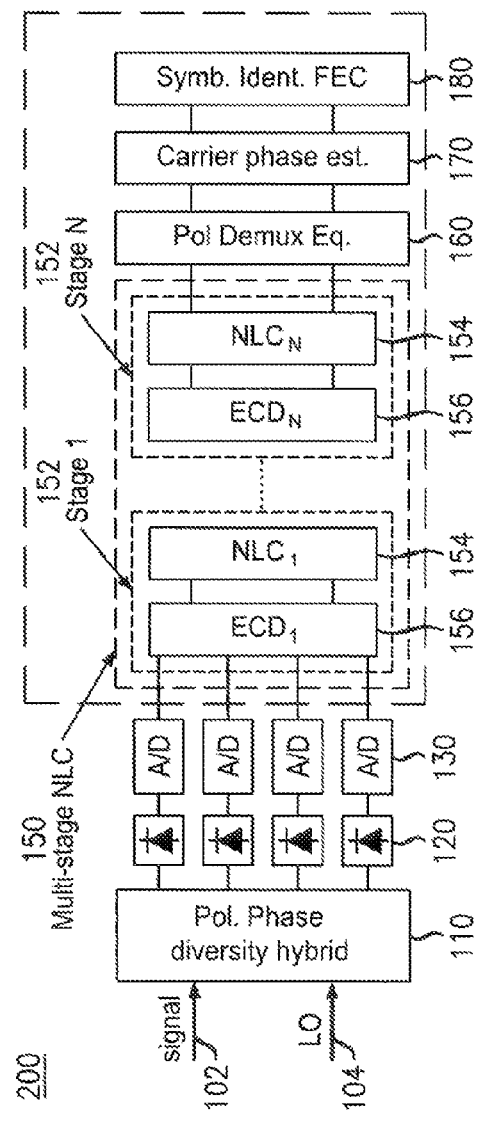
FIG. 1
FIG. 2

ELECTRONIC NONLINEARITY COMPENSATION FOR OPTICAL TRANSMISSION SYSTEMS

FIELD OF THE INVENTION

The invention relates to optical transmission systems, and in particular, to systems, apparatuses and techniques for electronic nonlinearity compensation for optical transmission systems.

BACKGROUND INFORMATION

Chromatic dispersion (CD) is a deterministic distortion given by the design of the optical fiber. It leads to a frequency dependence of the optical phase and its effect on transmitted signal scales quadratically with the bandwidth consumption or equivalently the data rate. Therefore, CD tolerances are reduced to $1/16$, if the data rate of a signal is increased by a factor of four (4). Up to a 2.5 Gb/s data rate optical data transmission is feasible without any compensation of CD even at long haul distances. At 10 Gb/s, the consideration of chromatic dispersion becomes necessary, and dispersion compensating fibers (DCF) are often used. At 40 Gb/s and beyond, even after the application of DCF the residual CD may still be too large for feasible optical communication.

Another transmission impairment experienced in optical transmission is Polarization-Mode Dispersion (PMD), which is a stochastic characteristic of optical fiber due to imperfections in production and installation. Pre-1990 fibers exhibit high PMD values well above $0.1$ ps/$\sqrt{km}$ which are border line even for 10 Gb/s. Newer fibers have a PMD lower than $0.1$ ps/$\sqrt{km}$, but other optical components in a fiber link such as reconfigurable add/drop multiplexers (ROADMs) may cause substantial PMD. If 40 Gb/s systems are to be operated over the older fiber links or over new fiber links with many ROADMs, PMD may become a significant detriment.

PMD can be compensated by optical elements with an inverse transmission characteristics to the fiber. However, due to the statistical nature of PMD with fast variation speeds up to the few kHz range, the realization of optical PMD compensators is challenging. With increases in channel data rate, optical signal is more and more limited by the transmission impairments in optical fiber, such as by CD and PMD.

Thus, digital coherent detection is considered as a promising technique for future high-speed optical transmission such as 100-Gb/s Ethernet, Terabit/s Ethernet and other next-generation optical transport systems. Optical coherent detection with digital signal processing is considered a promising technology for optical networks because of its high receiver sensitivity and capability to compensate for transmission impairments which critically impact the performance of high-speed transmission. It can effectively compensate most linear effects such as chromatic dispersion (CD) and polarization-mode dispersion (PMD) in the electrical domain using digital signal processing, and offers low required optical signal-to-noise ratio (OSNR) and high spectral efficiency compared with direct-detection. It has also been shown that digital signal processing in coherent receivers can partly compensate fiber nonlinear effects. However, due to the complexity of fiber nonlinear effects, it is not trivial to compensate fiber nonlinearities.

Recently, attention has been directed to electronic nonlinearity compensation using digital signal processing in coherent receivers, including the simple power-dependent nonlinear phase rotation method and the more complex backpropagation method. However, these methods are either not effective, are less than completely effective, or are too complex.

SUMMARY OF THE INFORMATION

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. Its sole purpose is to present some concepts in a simplified form as a prelude to the more detailed description that is discussed later.

Electronic nonlinearity compensation methods for use in coherent receivers are provided. These methods increase the efficiency of nonlinearity compensation in receivers and improve the performance of transmission systems. Such methods permit a reduction in the number of the nonlinearity compensator stages used for electronic nonlinearity compensation, which could significantly reduce the complexity and cost of receivers.

One example embodiment is a receiver which includes a digital signal processor configured to process a digital form of an input signal. The digital signal processor includes a first electronic chromatic dispersion compensation module for compensating the digital form of the input signal, at least one nonlinearity compensation stage for serially compensating an output of the electronic chromatic dispersion compensation module; and a second electronic chromatic dispersion compensation module for compensating an output of the at least one nonlinearity compensation stage.

System, method and apparatus embodiments are provided for efficient digital detection of optical signals. Example embodiments may also include steps and structure to perform digital detection and further processing of compensated digital signals in order to recover data carried by the modulated carriers in an optical signal.

In one embodiment, a receiver includes electronic dispersion management in at least one nonlinearity compensator (NLC) stage, with electronic CD pre-compensation prior to the NLC stage/s, CD post-compensation after the NLC stage/s. The receiver may have the same or a different setting of electronic chromatic dispersion compensator (ECD) value in each NLC stage. Note, throughout this description, there is no limitation as to the sign of the CD of the ECD—it could positive or negative and not necessarily of the opposite sign of the CD accumulated in a fiber span.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein:

FIG. 1 is a schematic diagram of an example receiver with a multi-stage electronic nonlinearity compensator (NLC) according to the prior art;

FIG. 2 is a schematic diagram of another example receiver with a multi-stage electronic NLC according to the prior art;

DETAILED DESCRIPTION

Figure 3:
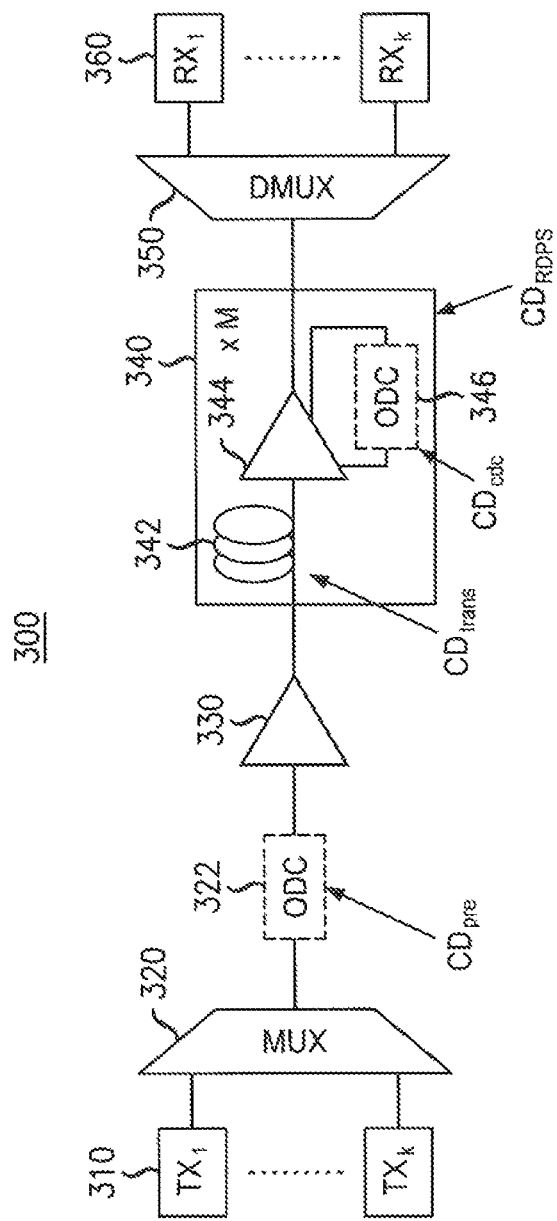
FIG. 3 is a schematic diagram of an example wavelength-division-multiplexed (WDM) optical transmission system.

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic diagram of an example receiver with a multi-stage electronic NLC according to the prior art. At the receiver 100, an optical signal 102 is mixed with a local oscillator 104 by polarization and phase diversity hybrid 110. A plurality of photodetectors 120 detect output signals of the polarization and phase diversity optical hybrid. The photodetectors may be balanced detectors, single ended detectors or a combination thereof. Thereafter, a plurality of analog-to-digital converters (A/D) 130 convert detected output signals from the plurality of photodetectors to a digital form. The digital form is provided to a Digital Signal Processor (DSP) 140 for processing of detected digital signals in order to recover data carried by the modulated carriers in the optical signal 102.

The digital form is provided to a multi-stage NLC 150. Multi-stage NLC 150 includes N NLC stages 152 where N is integer greater than or equal to one (e.g., Stage 1, Stage 2 . . . Stage N). In each NLC stage illustrated in FIG. 1, the digital form is provided to an NLC 154, followed by an electronic CD compensator (ECD) 156. The digital form is serially compensated by each NLC stage. For instance, the digital form is first compensated by the first NLC stage (i.e., $NLC_1$ 154 and $ECD_1$ 156); that compensated digital form is next compensated by a second NLC stage (i.e., $NLC_2$ and $ECD_2$) (not shown); and so on in turn, until that compensated digital form is next compensated by the Nth NLC stage (i.e., $NLC_N$ and $ECD_N$). After the nonlinear compensation provided by the multi-stage NLC 150, the N times compensated digital form is provide to a polarization demultiplexer 160, a carrier phase estimator 170 and a module for symbol identification and Forward Error Correction (FEC) 180. The polarization demultiplexing equalizer, "Pol. Demux Eq.", performs simultaneously polarization demultiplexing, PMD compensation (PMDC) and equalization of the signal, including for instance, compensation of spectral narrowing from filtering and compensation of a moderate amount of chromatic dispersion. The carrier phase estimator, "Carrier Phase Est.", performs an estimation of the carrier phase. The symbol identification and forward error correction (FEC), "Symb. Ident. FEC", identifies the received bits from the symbols detected and performs FEC.

In each stage of a Multi-stage NLC, either a NLC is after an ECD, or an ECD is after a NLC. Accordingly, FIG. 2 illustrates an alternative example receiver with a multi-stage nonlinearity compensator according to the prior art in which an NLC is after an ECD in each of the stages.

These prior art multi-stage NLCs are less than completely effective in compensating for fiber nonlinearity effects. One shortcoming of these prior art embodiments is that each stage of the multi-stage NLC is the same; that is the parameters to adjust the magnitude of the nonlinear phase rotation and CD are identical for each stage. An additional shortcoming of prior art receiver embodiments including multi-stage NLC is that there is no electronic dispersion management before and/or after the multi-stage NLC.

FIG. 3 is the schematic diagram of an example wavelength-division-multiplexed (WDM) optical coherent optical transmission system 300. A plurality of transmitters $TX_1$, $TX_2$, . . . $TX_k$ 310 each provides a channel which is supplied to multiplexer 320. Any one of the transmitters may utilize any of a variety of modulation schemes such polarization-division-multiplexed (PDM) Phase Shift Keying (PSK) and PDM Quadrature Amplitude Modulation (QAM), etc.

The multiplexed signal is amplified by amplifier 330 and inserted into the transmission link 340. An optional optical dispersion compensator (ODC) 322 may provide dispersion pre-compensation prior to insertion of the optical signal into the transmission link. The transmission link has M spans 340, where M is an integer greater than or equal to one. Each span comprises a fiber span 342, an amplifier 344 and optionally, an ODC 346. The fiber is a nonlinear medium and therefore has an associated nonlinear coefficient. Thus, the transmission link may be a dispersion-managed link with inline ODCs and optical pre-compensation, or may be an uncompensated link (with no ODCs). In one embodiment, the amplifier is an Erbium-doped fiber amplifier (EDFA). In another embodiment, the amplifier is a Raman-based amplifier. In yet another embodiment, distributed Raman amplification is utilized. Amplification schemes affect the signal power evolution along the fiber span/s.

After crossing M spans comprising the transmission link 340, the optical signal is provided to a demultiplexer 350 for wavelength demultiplexing, and the demultiplexed signals are provided to a plurality of receivers $RX_1$, $RX_2$, . . . $RX_k$ 360 for recovery of individual channels. The transmission link will typically suffer from fiber nonlinearity such as self-phase modulation (SPM), CD, and PMD. In one embodiment, the transmission system may also be a single channel system with one transmitter and receiver connected via a transmission link.

The CD for the illustrated transmission system may be modeled as follows: the CD in the transmission fiber in each span is $CD_{trans}$. In a dispersion-managed system, there is an optical dispersion compensator (ODC) 346 in each span 340 with CD of $CD_{odc}$. The residual dispersion per span (RDPS) in the dispersion-managed system is $CD_{RDPS} = CD_{trans} + CD_{odc}$, and in the system without ODCs, $CD_{RDPS} = CD_{trans}$. For the dispersion-managed system, there may also be $CD_{pre}$ for dispersion pre-compensation provided by ODC 322 prior to insertion of the optical signal into the transmission link.

Figure 4:
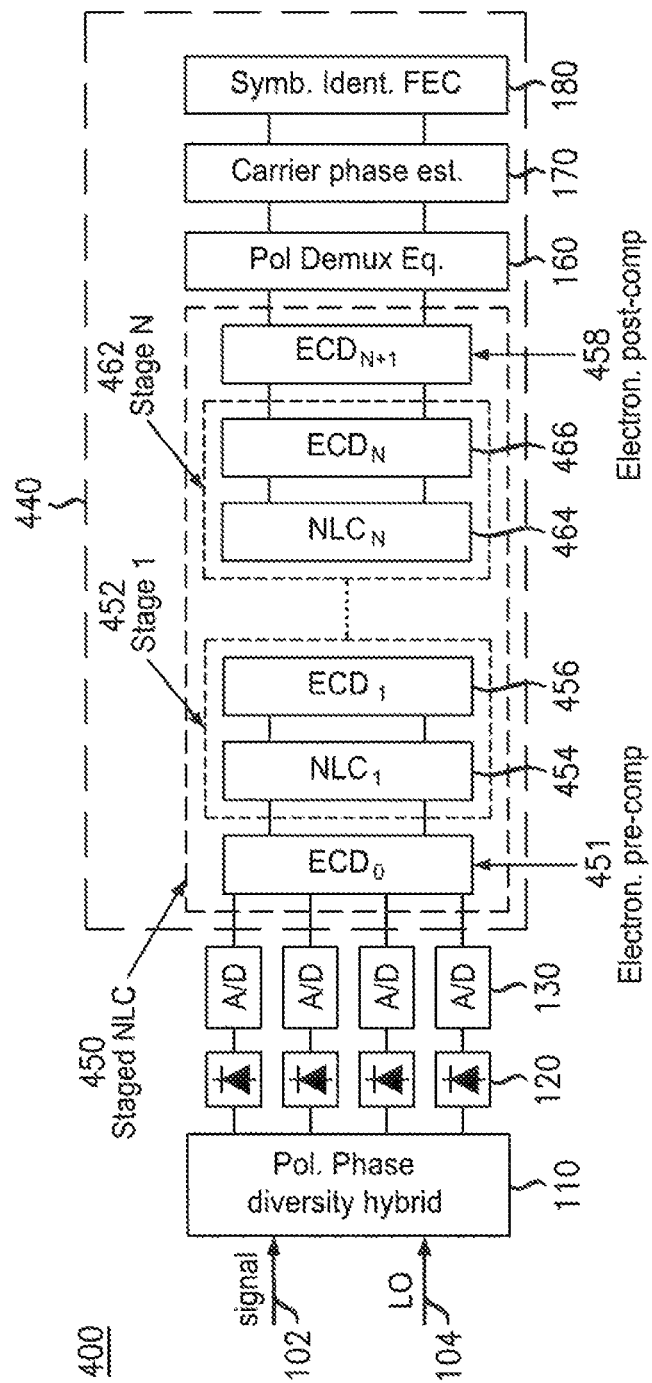
FIG. 4 is a schematic diagram of an example receiver according to the invention including an embodiment of a staged electronic NLC according to the invention for receiving a multi-carrier optical signal.

FIG. 4 is the schematic diagram of an example receiver according to the invention including an embodiment of a staged electronic NLC according to the invention for receiving an optical signal. The digital form from A/Ds 130 is provided to a Digital Signal Processor (DSP) 440 for processing of detected digital signals in order to recover data carried by the modulated carriers in the optical signal 102 carried on by the channel. In one embodiment, the receiver is an optical coherent receiver.

The DSP 440 includes a staged NLC 450 as described herein. The staged nonlinearity compensator 450 includes a first electronic CD compensation module (ECD$_0$) 451 for compensating the digital form of the input signal. The output of ECD$_0$ is provided to at least one nonlinearity compensation stage 452, 462 for serial compensation (Stage 1, 452 and Stage N, 462 being illustrated in FIG. 4). Thereafter the output of the at least one nonlinearity compensation stage is provided to a second electronic CD compensation module (ECD$_{N+1}$) 458 for further CD compensation.

The initial ECD (ECD$_0$) 451 compensates the digital form provided by the ADCs. Each NLC stage 452, 462 in the staged NLC then serially compensates the digital form. For instance, the digital form after the initial ECD is first compensated by the first NLC stage 452 (i.e., NLC$_1$ 454 and ECD$_1$ 456); that compensated digital form is next compensated by a second NLC stage (i.e., NLC$_2$ and ECD$_2$) (not shown); and so on in turn, until the serially compensated digital form is next compensated by an Nth NLC stage 462 (i.e., NLC$_N$ 464 and ECD$_N$ 466). Thus, in one embodiment, each NLC stage includes a NLC and an ECD.

After the nonlinear compensation provided by the NLC stages 452, 462, the N-times compensated digital form is provided to a second ECD module (ECD$_{N+1}$) 458 for further CD compensation. The thusly compensated signal is then provided to a polarization demultiplexer 160, a carrier phase estimator 170 and a symbol identification and Forward Error Correction (FEC) 180 module for ultimate recovery of the received optical signal.

In one embodiment, the staged electronic NLC 450 has N stages 452, where N is not larger than the number of spans, M (shown in FIG. 3), and each stage has one NLC 454 and one ECD 456. The ECD in each stage (ECD$_1$ to ECD$_N$) provides CD of $-M/N \cdot CD_{RDPS}$, where $CD_{RDPS}$ is RDPS in the transmission link, as shown in FIG. 3. The function of ECD is to provide CD compensation, and may be performed according to the following function:

$$f(\omega) = \exp\left(-j\frac{CD\lambda^2}{4\pi c}\omega^2\right)$$

where CD is the value of CD that the ECD compensates, $\lambda$ is the signal wavelength, c is the speed of light in vacuum, and $\omega$ is the angular frequency.

Also illustrated in FIG. 4 is ECD$_0$ 451, which is positioned before the first NLC stage 452, and which is adjustable and can be regarded as electronic pre-compensation. Further illustrated in FIG. 1 is ECD$_{N+1}$, which is positioned after the last NLC stage, and which is utilized to bring the total CD (sum of optical and electronic) close to zero and act as an electronic post-compensation. Note that ECD$_{N+1}$ and ECD$_N$ can be regarded as one electronic dispersion compensator with the compensation required by ECD$_N$ and ECD$_{N+1}$ being provided by a single ECD. In such an embodiment, electronic chromatic dispersion compensation for at least one of the at least one nonlinearity compensation stages (e.g., the final stage, Stage N) is provided by the same ECD that provides the electronic post compensation.

When N is not larger than the span number M, each NLC performs the following nonlinear phase rotation:

$$E'_x = E_x \exp[-j\chi(|E_x|^2 + |E_y|^2)] \quad (1.a)$$

$$E'_y = E_y \exp[-j\chi(|E_x|^2 + |E_y|^2)] \quad (1.b)$$

where $E_x$ and $E_y$ are the input electrical fields (proportional to the optical field in fibers) in the x and y polarizations, and $E'_x$ and $E'_y$ are the corresponding electrical fields at the output of the nonlinearity compensation, $\chi$ is the parameter to adjust the magnitude of the nonlinear phase rotation, and is identical for each NLC.

$\chi$ can been adjusted with some feedback signals monitoring the performance of the system, or set according to the following equation for the given total required electronic phase shift $\phi_{tot}^e$, which is related to the power evolution in one or more fiber spans and a fiber nonlinear coefficient of one or more fiber spans:

$$\chi = \frac{\phi_{tot}^e}{N(|E_x|^2 + |E_y|^2)_{ave}}$$

where $(|E_x|^2 + |E_y|^2)_{ave}$ ave is the average over time.

For example, feedback of one or more parameters associated with the transmission link, such as dispersion of a span, nonlinearity of a span, launch power, and span loss, may be utilized in conjunction with a look-up table to determine an appropriate setting of the parameter to be used to adjust the magnitude of the nonlinear phase rotation. As shown in the equation above, the nonlinearity compensation provided is based on an average total electronic phase shift, a number of nonlinearity compensation stages, and electrical signal power.

Again with reference to FIG. 4, in another example receiver for receiving an optical signal including another embodiment of staged electronic NLC according to the invention, the number of NLC stages is larger than the number of spans in the transmission link, that is N>M. Note that the received optical signal may be a multi-carrier optical signal. In this embodiment, the N stages are divided into M blocks, and each block has n stages, where N=n×M. Here, each span corresponds to a block and there are M spans and M blocks. Each block, ECD$_1$ to ECD$_{n-1}$ provide CD of $-CD_{trans}/n$, and ECD$_n$ provides CD of $-(CD_{trans}/n + CD_{odc})$. Each NLC in each block performs the following nonlinear phase rotation $$E'_x = E_x \exp[-j\chi_i(|E_x|^2 + |E_y|^2)], i=1,\ldots,n \quad (2.a)$$

$$E'_y = E_y \exp[-j\chi_i(|E_x|^2 + |E_y|^2)], i=1,\ldots,n \quad (2.b)$$

where $E_x$ and $E_y$ are the input electrical fields in the x and y polarizations, and $E'_x$ and $E'_y$ are the corresponding electrical fields at the output of the nonlinearity compensation, $\chi_i$ is the parameter to adjust the magnitude of the nonlinear phase rotation in ith stage in each block, and the parameter may be different for each stage.

$\chi_i$ can been adjusted according to feedback signals monitoring the performance of the system, or set according to the following equation for the given total required electronic phase shift $\phi_{tot}^e$:

$$M\sum_{i=1}^{n}\chi_i(|E_x|^2+|E_y|^2)_{ave}=\phi_{tot}^e$$

$$\chi_i=\chi_1\exp\left(\alpha\frac{iL_{span}}{n}\right)$$

where i=2, . . . , n, $L_{span}$ is the span length, and $\alpha$ is the fiber loss coefficient.

As illustrated, $ECD_0$ is also provided before the first stage, is adjustable and can be regarded as electronic pre-compensation. $ECD_{N+1}$ is provided after the last stage, acts as an electronic post-compensation and serves to bring the total CD (sum of optical and electronic) close to zero. Note that $ECD_{N+1}$ and $ECD_N$ (the ECD in the last stage of the last block) can be regarded as being provided by one electronic dispersion compensator.

After the nonlinear compensation provided by the staged NLC 450, the so compensated digital form is provided to a polarization demultiplexer 160, a carrier phase estimator 170 and a module for symbol identification and Forward Error Correction (FEC) 180. The digital signal processor (DSP) processes the digital form of the detected output signals in order to recover the data carried by the modulated carrier/s corresponding to the optical signal.

In one embodiment, the DSP 440 is further configured to compensate for other transmission impairments. These transmission impairments may include PMD and filtering effect. Thus, the DSP may include at least one of a dynamic equalization module using constant modulus algorithm (CMA) or other algorithms, a carrier separation module, a frequency estimation and compensation module, a phase estimation and compensation module, a demodulation module, and a data recovery module for processing the received optical signal. Note that the named modules perform the processing necessary to implement the stated name of the module. For example, the data recovery module recovers the data carried by the modulated carrier, etc.

A variety of the functions described above with respect to the example method are readily carried out by special or general purpose digital information processing devices acting under appropriate instructions embodied, e.g., in software, firmware, or hardware programming. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

What is claimed is:

1. A receiver comprising:
   a digital signal processor configured to process a digital form of an input signal, the digital signal processor including:
      a first electronic chromatic dispersion compensation module for compensating the digital form of the input signal;
      at least one nonlinearity compensation stage for serially compensating an output of the first electronic chromatic dispersion compensation module,
      wherein at least one of the at least one nonlinearity compensation stages comprises:
         a stage electronic nonlinearity compensator; and
         a stage electronic chromatic dispersion compensator; and
      a second electronic chromatic dispersion compensation module for compensating an output of a last of the at least one nonlinearity compensation stages.

2. The receiver of claim 1 wherein the second electronic chromatic dispersion compensation module is configured to provide electronic chromatic dispersion compensation for at least one of the at least one nonlinearity compensation stages.

3. The receiver of claim 1 wherein a parameter by which a magnitude of nonlinear phase rotation corresponding to the input signal is adjusted is identical for each nonlinearity compensation stage.

4. The receiver of claim 3 wherein the parameter is based on a power evolution in one or more fiber spans and a fiber nonlinear coefficient of the one or more fiber spans.

5. The receiver of claim 1 wherein a parameter by which a magnitude of nonlinear phase rotation is adjusted is different for each nonlinearity compensation stage.

6. The receiver of claim 1 wherein the first electronic chromatic dispersion compensation module and the second electronic chromatic dispersion compensation module provide chromatic dispersion (CD) compensation, and wherein the CD compensation is performed based on a first value or based on a system performance feedback signal.

7. The receiver of claim 1 wherein nonlinearity compensation provided by at least one of the at least one nonlinearity compensation stages is based on an average total electronic phase shift, a number of nonlinearity compensation stages, and electrical signal power.

8. The receiver of claim 1 wherein at least one of the at least one nonlinearity compensation stages performs the following nonlinear phase rotation:

$$E_x'=E_x\exp[-j\chi_i(|E_x|^2+|E_y|^2)], i=1,\ldots,n$$

$$E_y'=E_y\exp[-j\chi_i(|E_x|^2+|E_y|^2)], i=1,\ldots,n$$

wherein $E_x$ and $E_y$ are time-dependent input electrical fields in x and y polarizations, and $E'_x$ and $E'_y$ are corresponding electrical fields at output of the nonlinearity compensation stage, and $\chi_i$ is a parameter for adjusting the magnitude of the nonlinear phase rotation in an ith nonlinearity compensation stage.

9. The receiver of claim 8 wherein the parameter for adjusting the magnitude of the nonlinear phase rotation corresponding to the input signal is the same for each nonlinearity compensation stage.

10. The receiver of claim 1 wherein the last of the at least one nonlinearity compensation stages comprises a stage electronic nonlinearity compensator; and wherein the second electronic chromatic dispersion compensation module is further configured to provide stage electronic chromatic dispersion compensator for the last of the at least one nonlinearity compensation stages.

11. The receiver of claim 1 comprising
   a plurality nonlinearity compensation stages arranged in series, the output of first of the plurality nonlinearity compensation stages directed to a next of the plurality nonlinearity compensation stages.

12. An optical communication system comprising:
a receiver comprising:
a digital signal processor configured to process a digital form of an input signal, the digital signal processor including:
a first electronic chromatic dispersion compensation module for compensating the digital form of the input signal;
at least one nonlinearity compensation stage for serially compensating an output of the first electronic chromatic dispersion compensation module,
wherein at least one of the at least one nonlinearity compensation stages comprises:
a stage electronic nonlinearity compensator; and
a stage electronic chromatic dispersion compensator; and
a second electronic chromatic dispersion compensation module for compensating an output of the at least one nonlinearity compensation stage.

13. The optical communication system of claim 12 wherein the second electronic chromatic dispersion compensation module is configured to provide electronic chromatic dispersion compensation associated with a last of the at least one nonlinearity compensation stages.

14. The optical communication system of claim 12 wherein a last of the at least one nonlinearity compensation stages comprises a stage electronic nonlinearity compensator; and wherein the second electronic chromatic dispersion compensation module is further configured to provide stage electronic chromatic dispersion compensator for the last of the at least one nonlinearity compensation stages.

15. A method for processing a digital form of an input signal at a receiver, the method comprising:
performing a first electronic chromatic dispersion compensation on the digital form of the input signal;
compensating an output of the first electronic chromatic dispersion compensation using at least one nonlinearity compensation stage, wherein said compensating using at least one nonlinearity stage comprises
performing nonlinearity compensation on the output of the first electronic chromatic dispersion compensation, and
performing an additional electronic chromatic dispersion compensation on the nonlinearity compensated output of the first electronic chromatic dispersion compensation; and
performing a second electronic chromatic dispersion compensation on an output of a last of the at least one nonlinearity compensation stage.

16. The method of claim 15 wherein compensating an output of the first electronic chromatic dispersion compensation using at least one nonlinearity compensation stage comprises:
serially processing the output of the first electronic chromatic dispersion compensation through a plurality of nonlinearity compensation stages.

17. The method of claim 15 wherein performing a second electronic chromatic dispersion compensation on an output of the at least one nonlinearity compensation stage includes:
performing electronic chromatic dispersion compensation for a last of the of the at least one nonlinearity compensation stages.

18. The method of claim 15 wherein a parameter by which a magnitude of nonlinear phase rotation corresponding to the input signal is adjusted is identical for each nonlinearity compensation stage.

19. The method of claim 15 wherein the parameter is based on a power evolution in one or more fiber spans and a fiber nonlinear coefficient of the one or more fiber spans.

20. The method of claim 15 wherein at least one of the at least one nonlinearity compensation stages performs the following nonlinear phase rotation:

$$E_x' = E_x \exp[-j\chi_i(|E_x|^2 + |E_y|^2)], i=1,\ldots,n$$

$$E_y' = E_y \exp[-j\chi_i(|E_x|^2 + |E_y|^2)], i=1,\ldots,n$$

wherein $E_x$ and $E_y$ are time-dependent input electrical fields in x and y polarizations, and $E'_x$ and $E'_y$ are corresponding electrical fields at output of the nonlinearity compensation stage, and $\chi_i$ is a parameter for adjusting the magnitude of the nonlinear phase rotation in an ith nonlinearity compensation stage.

* * * * *